Patented Dec. 9, 1930

1,784,599

UNITED STATES PATENT OFFICE

HANS JORDAN, OF BERLIN-STEGLITZ; WALTER SCHOELLER, OF BERLIN-WESTEND; AND REINHARD CLERC, OF BERLIN, GERMANY, ASSIGNORS TO THE FIRM: CHEMISCHE FABRIK AUF ACTIEN VORM E. SCHERING, OF BERLIN, GERMANY

METHOD OF PRODUCING PHENOLS

No Drawing. Application filed August 15, 1927, Serial No. 213,206, and in Germany November 16, 1926.

Our invention refers to chemical products and more especially to phenolic bodies and to the method of making same.

Our invention is based on the discovery disclosed in the copending applications for patent of the United States, filed by Hans Jordan alone and with Walter Schoeller jointly, respectively, Serial Nos. 200,290, 200,289, 200,298, and 200,297, that the products resulting in the condensation of alkyl phenols and ketones, if decomposed at elevated temperature and thereafter or simultaneously subjected to hydrogenation in the presence of suitable catalysts, will be converted into thymol, its isomers or homologues, or into the corresponding hexahydro compounds including menthol, according to the number of hydrogen atoms which have entered into combination, and that hydrogenation could be effected at lower temperature, if besides the catalyst ordinarily used for hydrogenation another catalyst is present which is capable of depressing the temperature of decomposition of the condensation products.

We have now found by experiment that simultaneous decomposition and hydrogenation of these condensation products as well as of other ether-like condensation products such as described for instance by Gaebel (Ueber Kondensationsprodukte aus m-Kresol und p-Kresol mit Aceton, Dissertation Marburg 1903) and by Dianin (Berichte 25, Referate 334) and of other ether-like compounds in general, including mixed and more especially cyclic ethers, such as cumaranes, can be brought about in a particularly effective manner, if the operation is carried through at a higher temperature than usual in this kind of hydrogenation processes. As is well known, hydrogenation of phenols, naphthalin and similar compounds is effected at temperatures not exceeding 180° C. in maximo.

In contradistinction thereto we have found that if the condensation products aforementioned or described in Hans Jordan's copending application Serial No. 200,289 are treated with hydrogen under pressure in the presence of a catalyst, the temperature being raised to about 280° C., the molecules will be readily decomposed at one or several ether linkage points and at the same time the unsaturated side chain will take up hydrogen, if desired, even up to the formation of hexahydro compounds.

We have further found that the reaction will be expedited and will occur at considerably lower temperature, for instance between 190 and 230° C., if a suitable diluent, for instance menthane, is present, a mixture of thymol or menthol and cresol being for instance formed in this case.

We have also ascertained that the mixed and more especially cyclic ethers, for instance the cumaranes, will already be decomposed at a temperature of about 200° C.

Example 1

The condensation product which can be obtained by condensing m-cresol and acetone in the presence of a condensing agent, for instance hydrochloric acid, at temperatures below 100° C., is treated in the presence of a nickel catalyst under pressure and at a temperature of about 180° C. with hydrogen, until 4 atoms hydrogen have entered into combination. There results 3-methyl-6-isopropyl phenol (thymol).

Example 2

By treating in a similar manner the condensation product from p-cresol and acetone, 4-methyl-6-isopropyl phenol (p-thymol) is obtained.

Example 3

The ether-like condensation product from m-cresol and acetone described by Gaebel supra and which has the formula

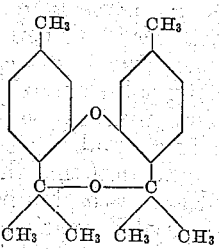

is treated at 250–280° C. in the presence of a catalyst with hydrogen. If this treatment is interrupted after 4 hydrogen atoms have entered into the molecule, thymol is obtained from the resulting product.

Example 4

By treating the ether-like condensation product obtained according to Gaebel from p-cresol and acetone as described with reference to Example 3, there is obtained 4-methyl-2-isopropyl phenol.

Example 5

If dimethyl cumarane

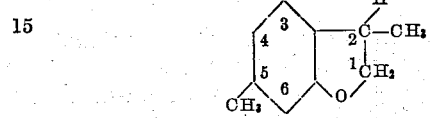

(described in the copending application Serial No. 200,291) is treated at 235–250° C. with hydrogen in the presence of a mixed catalyst containing the carbonates of Ni, Co, and Cu or other heavy metals, there result thymol and its isomers, if this treatment is interrupted after 4 hydrogen atoms have entered the molecule.

Example 6

The product of condensation from α-naphthol and acetone described by Dianin supra as being obtained by condensing α-naphthol at 60° C. with acetone in a glacial acetic acid solution in the presence of hydrochloric acid is treated at 280–320° C. with hydrogen in the presence of a mixed catalyst such as described in Example 5. There results a mixture of isopropyl naphthol, naphthalin, isopropyl naphthalin, and naphthol. Isopropyl naphthol is constituted according to the formula

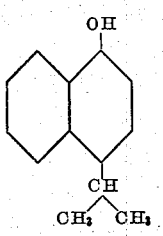

The catalysts spoken of in the above examples are such as are used in other hydrogenation processes which are described by Sabatier (Die Katalyse in der organischen Chemie, Leipzig 1927) as being obtained by precipitating mixtures of carbonates or hydroxides from solutions of the respective metal salts, these mixtures being well rinsed, dried and finely ground.

While it is important that the temperature be maintained above the temperature usually employed in hydrogenation processes, the pressure has no influence on the reaction itself, but only on the time required for the carrying through of the process. It is to be understood that the pressure must be so high as to exceed the vapor tension of the final products to be obtained and, if the catalysts used have not been previously reduced, the vapor tension of the catalyst water formed at the respective temperature. It has surprisingly been found that mixed and more especially cyclic ethers such as for instance the cumaranes can be brought to react far more readily in the manner described, so that in this case a temperature of about 200° C. will suffice to decompose the ether-like compounds, while in other cases the temperature must be raised above 280° C.

Various changes may be made in the details disclosed in the foregoing specification without departing from the invention or sacrificing the advantages thereof.

We claim:—

1. The method of producing saturated phenols comprising acting at a temperature between 180° and 320° C. with hydrogen under pressure in the presence of a hydrogenation catalyst on a product obtained by condensation in the presence of an acidic condensing agent of an alkyl phenol and an aliphatic ketone.

2. The method of producing saturated phenols comprising acting at a temperature between 180° and 320° C. with hydrogen under pressure in the presence of a hydrogenation catalyst on a product obtained by condensation in the presence of an acidic condensing agent of a cresol and acetone.

3. The method of producing methyl isoalkyl phenols comprising acting at about 280° C. with hydrogen under pressure in the presence of a hydrogenation catalyst on the product obtained by condensation in the presence of an acidic condensing agent of an aliphatic cresol and a ketone until 4 atoms of hydrogen have entered into combination.

4. The method of producing methyl isoalkyl phenols comprising acting at about 280° C. with hydrogen under pressure in the presence of a hydrogenation catalyst and a diluent on the product obtained by condensation in the presence of an acidic condensing agent of a cresol and an aliphatic keytone until 4 atoms of hydrogen have entered into combination.

5. The method of producing thymol comprising acting at about 280° C. with hydrogen under pressure in the presence of a hydrogenation catalyst on the product obtained by condensation in the presence of an acidic condensing agent of m-cresol and acetone until 4 atoms of hydrogen have entered into combination.

6. The method of producing thymol comprising acting at about 280° C. wth hydrogen under pressure in the presence of a hydrogenation catalyst and a diluent on the product obtained by condensation in the presence of an acidic condensing agent of m-cresol and acetone, until 4 atoms of hydrogen have entered into combination.

In testimony whereof we affix our signatures.

HANS JORDAN.
WALTER SCHOELLER.
REINHARD CLERC.